United States Patent [19]

Lowe et al.

[11] Patent Number: 5,601,147
[45] Date of Patent: Feb. 11, 1997

[54] AGRICULTURAL RIG PRESSURE ADJUSTMENT WITH OVERCENTER TOGGLE

[75] Inventors: Terry L. Lowe, Ankeny; James T. Noonan, Johnston, both of Iowa

[73] Assignee: Deere & Company, Moline, Ill.

[21] Appl. No.: 559,979

[22] Filed: Nov. 17, 1995

[51] Int. Cl.⁶ .................................................. A01B 63/32
[52] U.S. Cl. ........................................ 172/624.5; 172/744
[58] Field of Search .............................. 172/624.5, 734, 172/744

[56] References Cited

U.S. PATENT DOCUMENTS

| | | | |
|---|---|---|---|
| 2,580,480 | 1/1952 | Streblow et al. | |
| 3,708,019 | 1/1973 | Ryan | 172/624.5 X |
| 4,461,355 | 7/1984 | Peterson et al. | 172/624.5 X |
| 4,766,962 | 8/1988 | Frase | 172/624.5 |
| 4,846,084 | 7/1989 | Sigle | 172/624.5 X |
| 4,974,683 | 12/1990 | Hanig et al. | 172/624.5 X |
| 5,163,518 | 11/1992 | Foley | 172/624.5 X |

*Primary Examiner*—Terry Lee Melius
*Assistant Examiner*—Christopher J. Novosad

[57] ABSTRACT

Down pressure structure for providing an adjustable down force on a rig of row crop implement such as a cultivator includes an overcenter toggle connected to the rig for pivoting about a toggle axis between a first and second positions. The toggle has a protrusion that contacts the edge of a rig plate at two different locations corresponding to a light and a heavy down pressure position. A down pressure spring is tensioned between the frame and the toggle and maintains the toggle in a selected one of two overcenter positions corresponding to the two different spring tension positions. A hex projection on the toggle receives a conventional wrench for moving the toggle between the first and second positions. A second toggle and down pressure spring combination provide additional spring adjustments so that at a numerous easily determinable down pressure settings are available.

11 Claims, 3 Drawing Sheets

AGRICULTURAL RIG PRESSURE ADJUSTMENT WITH OVERCENTER TOGGLE

BACKGROUND OF THE INVENTION

1) Field of the Invention

The present invention relates generally agricultural devices such as row crop cultivator rigs or the like having down pressure springs and, more specifically, to a down pressure adjustment for such a rig.

2) Related Art

Implements such as row crop cultivators or planters often utilize a parallel linkage to connect a cultivator rig or planter assembly to a transverse tool bar or frame member. To bias the rig downwardly, coil springs may be tensioned diagonally between links. Some of the previously available rigs such as the type shown in U.S. Pat. No. 4,461,355 include a threaded adjustment to vary the tension of the springs and adjust the down pressure. Threaded adjustments typically require one or more tools to change the spring tension for the desired down pressure. Making adjustments to the down pressure for various rig tool combinations and ground and crop conditions can be very time consuming and difficult.

Some pressure adjusting systems for parallel linkages have structure for moving one end of the springs along one of the links. A rack and pinion arrangement, shown in U.S. Pat. No. 4,766,962, adjusts springs along the upper link of the parallel linkage to change spring tension and thereby adjust the down pressure. Such systems require a special retaining member which adds cost and complexity to the structure.

Most rig assemblies do not have a convenient or easily readable gauge or marking to determine the spring tension setting or provide repeatable settings. With some pressure adjusting systems overtensioning is possible to the extent that stresses become greater than desired when the rig is in the working position.

BRIEF SUMMARY OF THE INVENTION

It is therefore an object of the present invention to provide an improved down pressure arrangement which overcomes some or all of the aforementioned problems. It is a further object to provide such an improved down pressure arrangement which is simply constructed and which facilitates quick and easy adjustment of down pressure.

It is a further object of the present invention to provide an improved down pressure arrangement wherein adjustments can be made quickly and easily and wherein the preselected adjustment is maintained in a simple manner without special retainers or locking procedures. It is yet another object to provide such an arrangement wherein different combinations of spring tension can be established. It is still another object to provide such an arrangement which reduced or eliminates spring over-tensioning.

It is still another object of the present invention to provide an improved down pressure arrangement for a row crop rig wherein down pressure can be determined easily by a visual inspection, and wherein a preselected down pressure can be repeated for a plurality of rigs. It is a further object to provide such an arrangement which is relatively simple and inexpensive in construction and which does not require rack and pinion structure or screw thread adjustments. It is still another object to provide such a down pressure arrangement wherein spring tension is easily adjustable with a standard wrench.

A rig assembly constructed in accordance with the teachings of the present invention includes an overcenter toggle located on the side of the upright plate of a four-bar linkage. A down pressure spring is connected at one end to a lever on the toggle which is pivotally connected to the plate. The lever has a protrusion that contacts the edge of the plate at two different locations corresponding to light and heavy down pressure positions. A hex protrusion, the same size as other wrench-adjusted hardware on the implement, is located on the lever to provide for convenient movement between the two lever positions to vary down pressure.

One or two pairs of the down pressure spring and toggles can be used on each rig to provide up to five or more different down pressure settings. The settings are easily determined by a visual inspections and are repeatable. Rigs on a tool bar can be quickly adjusted to known settings with an available wrench, and the adjustments can be varied to accommodate such conditions as a rig operating in a wheel track.

These and other objects, features and advantages of the present invention will become apparent to one skilled in the art upon reading the following detailed description in view of the drawings.

DETAILED DESCRIPTION OF THE DRAWINGS

Figure 1:
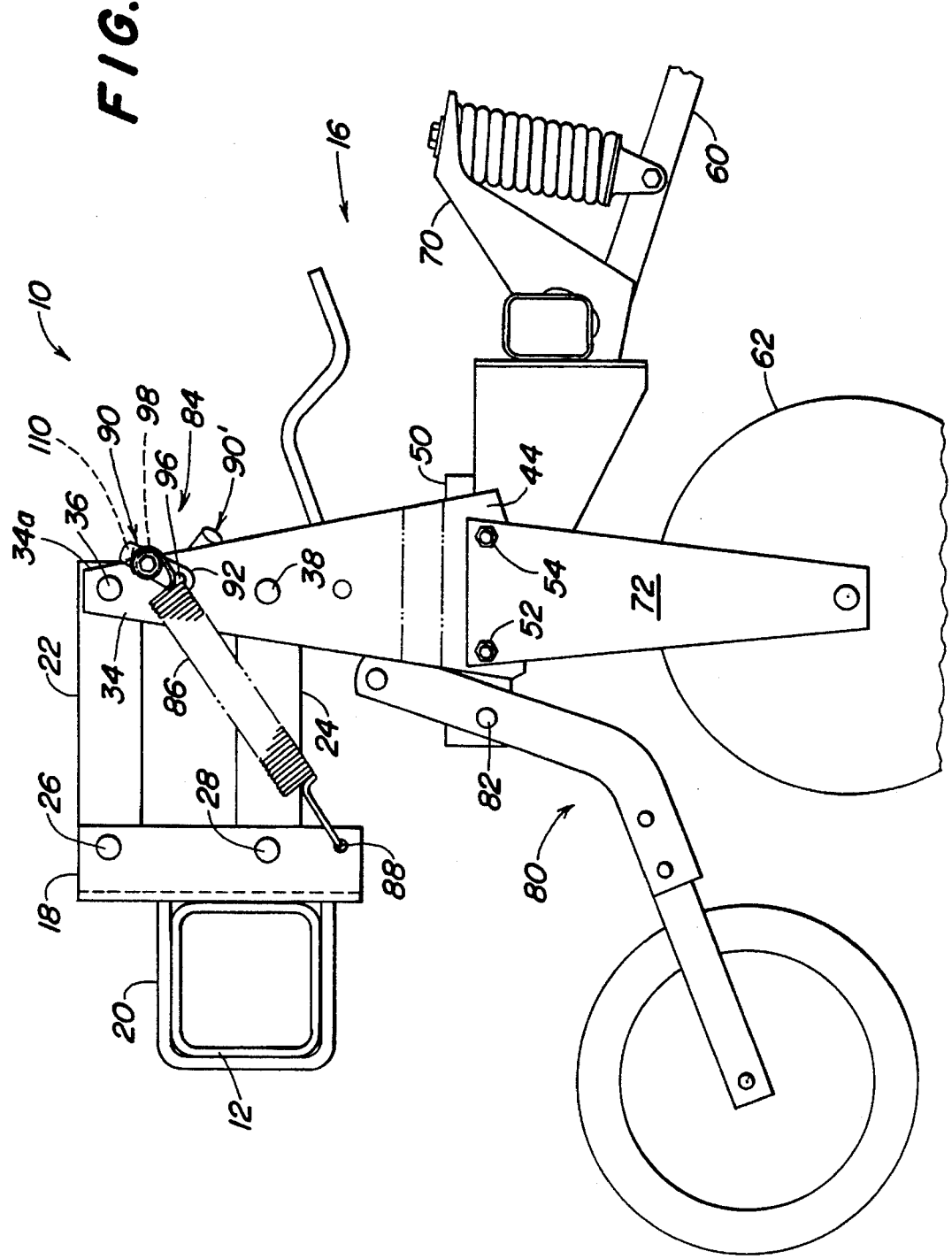
FIG. 1 is a side view of a portion of an agricultural rig assembly including a spring down pressure adjustment.
Figure 2:
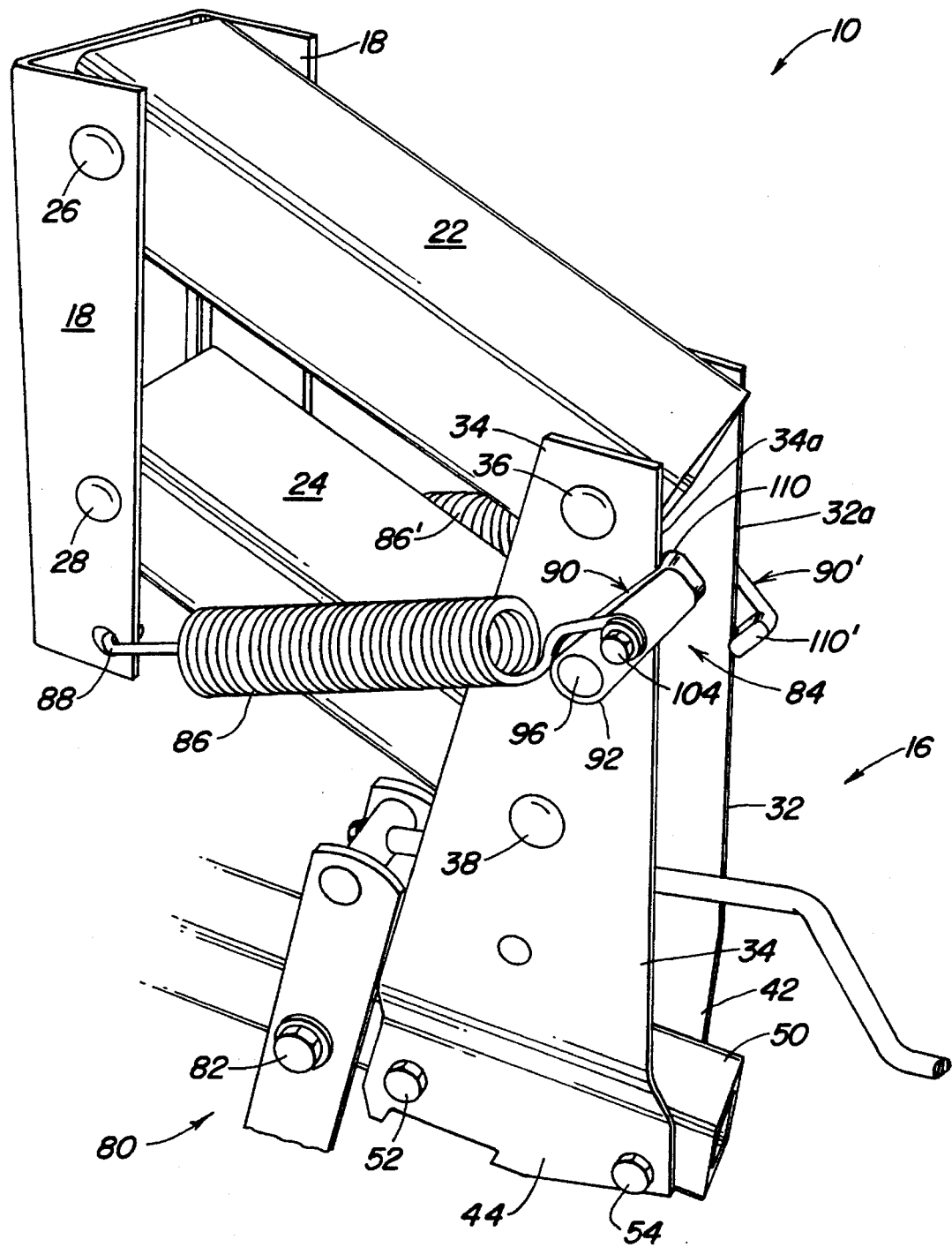
FIG. 2 is an enlarged perspective view of a portion of the rig assembly of FIG. 1.

Referring now to FIGS. 1 and 2, therein is shown a portion of an agricultural implement 10 such as a row crop cultivator. A transversely extending implement frame or tool bar 12 is connected to conventional vertically movable hitch structure (not shown) on a tractor for forward movement over a field. A plurality of individual cultivator rigs 16 are connected by upright brackets 18 and U-bolts 20 to locations transversely spaced along the tool bar 12. A pair of fore-and-aft extending and generally parallel upper and lower arms or tubes 22 and 24 are connected at their forward ends to rearwardly extending flanges of the brackets 18 by pivots 26 and 28. The aft ends of the arms 22 and 24 are embraced by a pair of transversely spaced, upright plates 32 and 34 (FIG. 2) pivotally connected to the arms by pivots 36 and 38. The plates 32 and 34 narrow in the upward direction and have lower apertured ends 42 and 44 which are bent towards each other and then downwardly to define upright mast structure with a rig tube supporting area. The plates 32 and 34 include upright aft edges 32a and 34a.

A fore-and-aft extending rig tube 50 is supported between the lower ends 42 and 44 of the plates 32 and 34 in a substantially horizontal attitude by connecting bolts 52 and 54 (FIG. 1). Earthworking tools, such as shown at 60 and 62 in FIG. 1, are supported from the rig tube 50 by tool supports 70 and 72 connected by suitable brackets and/or cross tubes to the tube 50. The tube 50 projects both forwardly and rearwardly from the ends 42 and 44, with the distance of the projections being variable to accommodate numerous combinations and locations of the different tools. Adjustable gauge wheel structure 80 is pivotally connected at location 82 to the rig tube 50 to establish a tool working depth. An adjustable down pressure structure indicated generally at 84 provides an adjustable down force on the rig 16.

Figure 4:
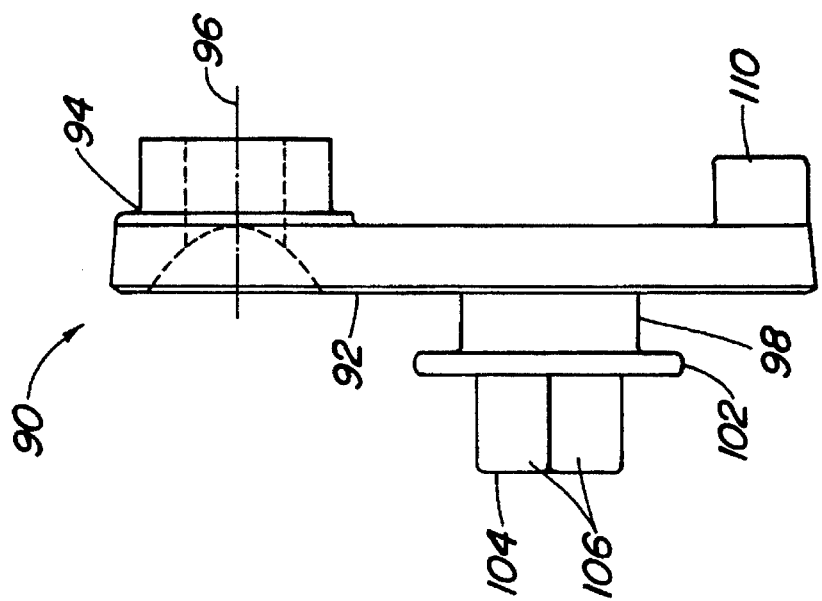
FIG. 4 is an end view of the toggle lever of FIG. 3.
Figure 3:
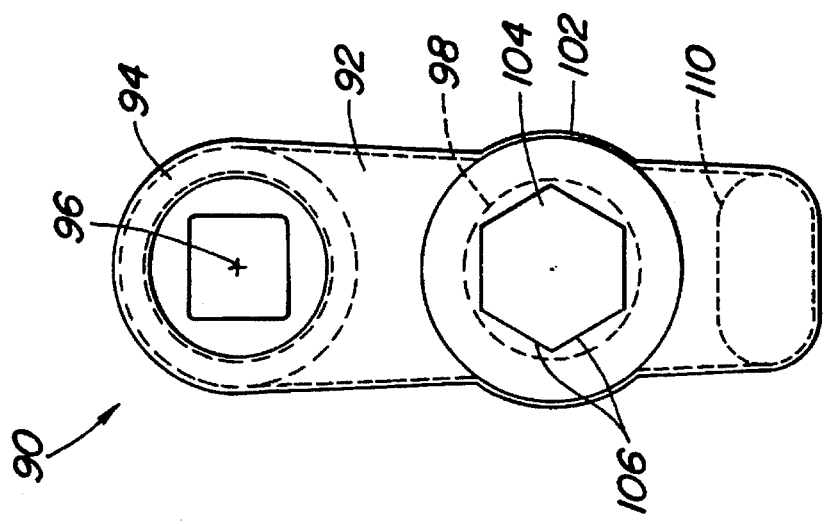
FIG. 3 is a side view of the toggle lever utilized with the down pressure spring adjustment.

The down pressure structure 84 includes a spring 86 tensioned between the frame 12 and the rig 16. As seen in FIG. 1, the spring 86 includes a distal end 88 connected to a the bottom of the upright bracket 18. The spring 86 also includes a proximate end connected to toggle structure 90. The toggle structure 90 includes a lever 92 (FIGS. 3 and 4) having a first or pivot end 94 connected to the plate 34 for pivoting about an axis 96 between a first or high tension overcenter position (see 90 in FIG. 1) and a second or lower tension overcenter position. The pivot end 94 supports the lever closely adjacent and parallel to the plate 34. A spring support 98 with an enlarged radius retaining portion 102 projects outwardly from the outermost side of the lever 92 at a location radially offset from the axis 96. A wrench-receiving projection 104 with flats 106 arranged in a hex pattern extends outwardly from the retaining portion 102. A protrusion or stop member 110 projects inwardly from the inner side of the lever 92 at an aft location radially outwardly of the spring support 98. The stop member 110 is located behind and contacts the aft edge 34a at opposite ends of an arc centered on the axis 96 to limit the pivotal movement of the lever 92.

The proximate end of the spring 86 is mounted on the spring support 98 and maintains downward bias on the rig 16. In the high tension overcenter position (up position) of the lever 92, the spring support 98 is located farther from the pin 88 than when the lever is in the lower tension position (down position). As best seen in FIG. 2, the lever 92 in the high tension position supports proximate end of the spring above a line which extends through the pin 88 and the pivotal axis 96. In the lower tension position, the lever 92 supports the proximate end of the spring 86 below the line extending through the pin 88 and the pivotal axis 96. The spring tension maintains the lever 92 in the desired overcenter position.

For a relatively low rig down pressure, the lever 92 is positioned in the low tension position (down as shown in FIG. 1). To increase the rig down pressure, for example, when the tools 60–62 are operating in a track, the operator simply positions a hex wrench over the flats 106 to provide mechanical advantage and rotates the lever 92 upwardly against the bias of the spring 86 until the lever goes over center and the stop member 110 bottoms against the upper part of the edge 34a. The distance between the distal end 88 and the spring support 98 increases to increase the spring tension and thereby increase the rig down pressure. If additional down pressure is necessary, a second spring 86' may be tensioned on the opposite side of the rig (FIG. 2) between a second distal end 88' and a second toggle structure 90'. The second spring and second toggle structure 86' and 90' are substantially similar in construction and operation to that of the spring and toggle 86 and 90, and so will not be described in further detail. Preferably, the structures 90 and 90' operate independently of each other, and by using different combinations of springs 86 and 86' and/or different combinations of positions of the toggle structures 90 and 90' (see FIG. 2 wherein one toggle is up and the other is down), numerous different down pressure adjustments are possible. The down pressure setting can easily be determined by a quick inspection of the positions of the toggles 90 and 90'.

Having described the preferred embodiment, it will become apparent that various modifications can be made without departing from the scope of the invention as defined in the accompanying claims. For example, although the toggle structures are shown on the upright plates 32 and 34 for convenient access next to the depth adjusting structure 80, the structures could alternatively be located at the opposite ends of the springs 86 and 86' for access adjacent the frame 12.

We claim:

1. In an agricultural rig having a main frame and a linkage pivotally connected to the main frame and extending rearwardly therefrom, rig down pressure structure for providing an adjustable down force on the rig, the down pressure structure comprising:

a toggle connected to the rig for pivoting about a toggle axis between first and second positions;

a spring structure tensioned between the main frame and the toggle and having first and second ends, the first end connected to the main frame and the second end connected to the toggle;

structure connected to the toggle for moving the toggle between the first and second positions to thereby adjust the tension in the spring; and wherein the toggle includes a protrusion which contacts the rig at two different overcenter locations corresponding to the first and second positions of the toggle.

2. In an agricultural rig having a main frame and a linkage pivotally connected to the main frame and extending rearwardly therefrom, rig down pressure structure for providing an adjustable down force on the rig, the down pressure structure comprising:

a toggle connected to the rig for pivoting about a toggle axis between first and second positions;

a spring tensioned between the main frame and the toggle and having first and second ends, the first end connected to the main frame and the second end connected to the toggle; and structure connected to the toggle for moving the toggle between the first and second positions to thereby adjust the tension in the spring;

wherein the first and second positions are on opposite sides of an imaginary line passing through the first end of the spring and the toggle axis.

3. In an agricultural rig having a main frame and a linkage pivotally connected to the main frame and extending rearwardly therefrom to a tool-supporting mast structure, rig down pressure structure for providing an adjustable down force on the rig, the rig down pressure structure comprising:

a toggle connected to the tool-supporting mast structure for pivoting about a toggle axis, the toggle having a projecting stop member contacting offset portions of the tool-supporting mast structure at first and second preselected positions and a spring mounting member radially offset from the toggle axis, wherein the distance between the spring mounting member and the main frame varies depending on the pivotal position of the toggle;

a spring having proximate and distal ends, the distal end connected to the main frame and the proximate end connected to the spring mounting member; and structure connected to the toggle for moving the toggle between the first and second positions to thereby adjust the tension in the spring.

4. The invention as set forth in claim 3 wherein the toggle and the spring comprise a first toggle member and a first spring member, and further comprising a second toggle member and a second spring member tensioned between the main frame and the second toggle member, the second toggle member also movable between first and second positions to adjust the tension in the second spring member, whereby the spring and toggle members provide more than two combinations of spring tensions for a plurality of different down pressure adjustments.

5. The invention as set forth in claim 3 wherein the first and second positions of the toggle comprise overcenter positions, and wherein the toggle is maintained in a selected position by the tension in the spring.

6. The invention as set forth in claim 5 wherein the first and second positions are on opposite sides of an imaginary line passing through the distal end of the spring and the toggle axis.

7. The invention as set forth in claim 3 wherein the structure connected to the toggle for moving the toggle includes a projection adapted to receive a wrench for providing mechanical advantage.

8. In an agricultural implement having a frame and a pivoting rig biased by a spring having a proximate end connected to the pivoting rig and a distal end connected to the frame with the spring tensioned between the pivoting rig and the frame, a spring tension adjustment comprising:

a lever pivotally connected to the pivoting rig for rocking about an axis and having first and second stop positions;

a spring mount connected to the lever at a position radially outwardly of the axis, the Spring mount connected to the proximate end of the spring and moving with the lever to first and second tensioning positions corresponding to the first and second stop positions of the lever, wherein the tension in the spring is dependent on the position of the lever; and wherein the lever and spring mount comprise a first lever member and a first spring mount member located on a first side of the pivoting rig, and further including a second lever member and a second spring mount member located on a side of the pivoting rig opposite the first side, and wherein the second lever member is movable independently of the first lever member to thereby provide more than two different spring pressure adjustments.

9. In an agricultural implement having a frame and a pivoting rig biased by a spring having a proximate end connected to the pivoting rig and a distal end connected to the frame with the spring tensioned between the pivoting rig and the frame, a spring tension adjustment comprising:

a lever pivotally connected to the pivoting rig for rocking about an axis and having first and second stop positions;

a spring mount connected to the lever at a position radially outwardly of the axis, the spring mount connected to the proximate end of the spring and moving with the lever to first and second tensioning positions corresponding to the first and second stop positions of the lever, wherein the tension in the spring is dependent on the position of the lever; and wherein the spring mount in the first stop position of the lever lies on one side of a line extending from the distal end of the spring through the axis of the lever and on the opposite side of the line when the lever is in the second stop position.

10. The invention as set forth in claim 9 wherein the lever comprises an overcenter toggle selectively held in either of the two positions by the tension in the spring.

11. The invention as set forth in claim 10 wherein the lever includes a projecting stop member which engages the pivoting rig in both the first and the second stop positions.

* * * * *